Jan. 9, 1934.  C. H. BARTON  1,942,633
TRANSMISSION
Filed Dec. 22, 1930  2 Sheets-Sheet 1
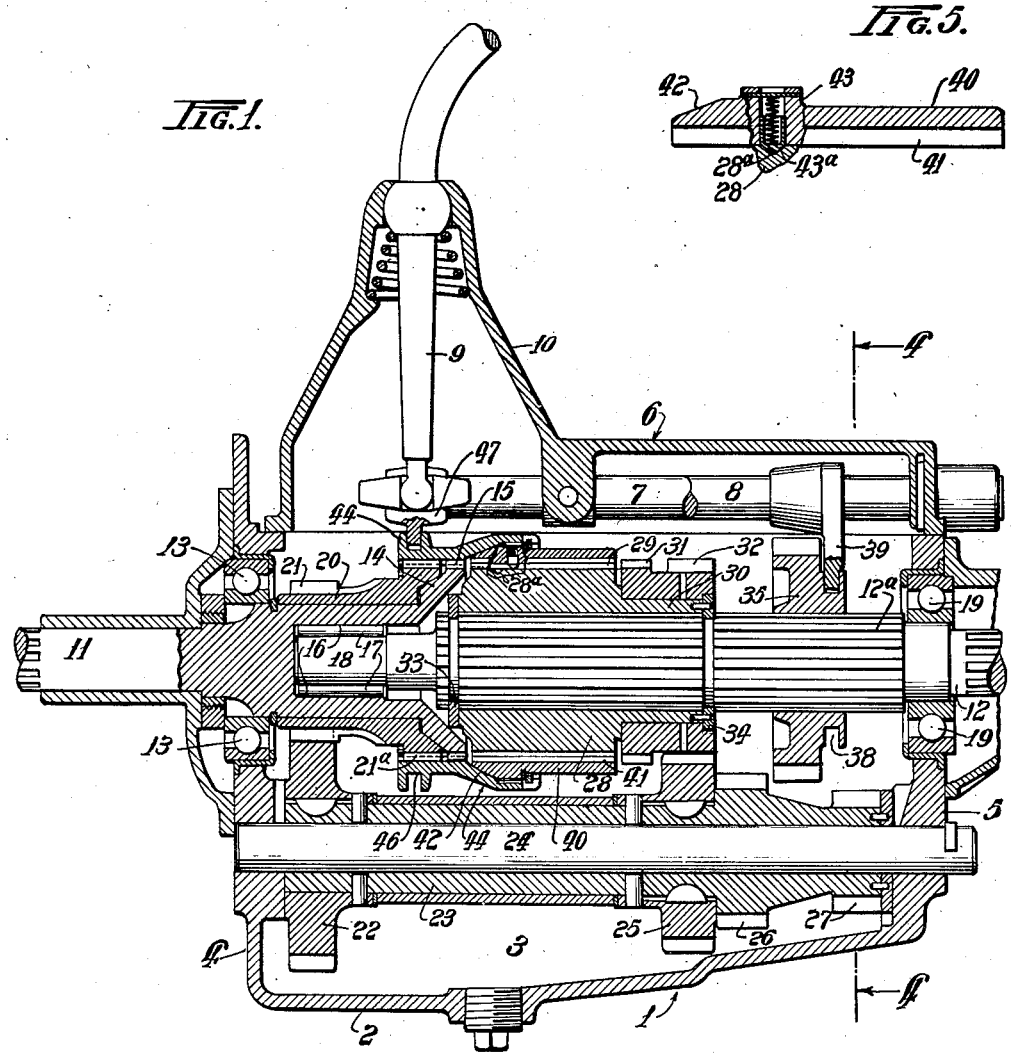
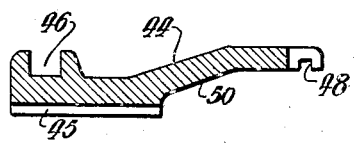
Inventor:
Clarence H. Barton,
By: Arthur Wm Wilson
Att'y.

Jan. 9, 1934.　　　C. H. BARTON　　　1,942,633
TRANSMISSION
Filed Dec. 22, 1930　　2 Sheets-Sheet 2
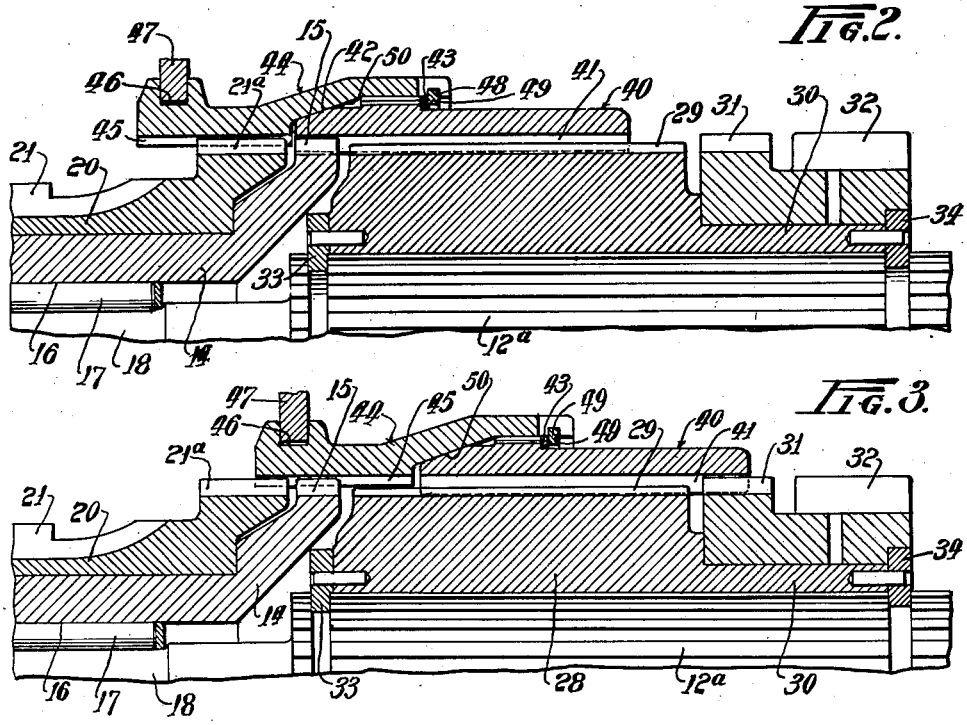
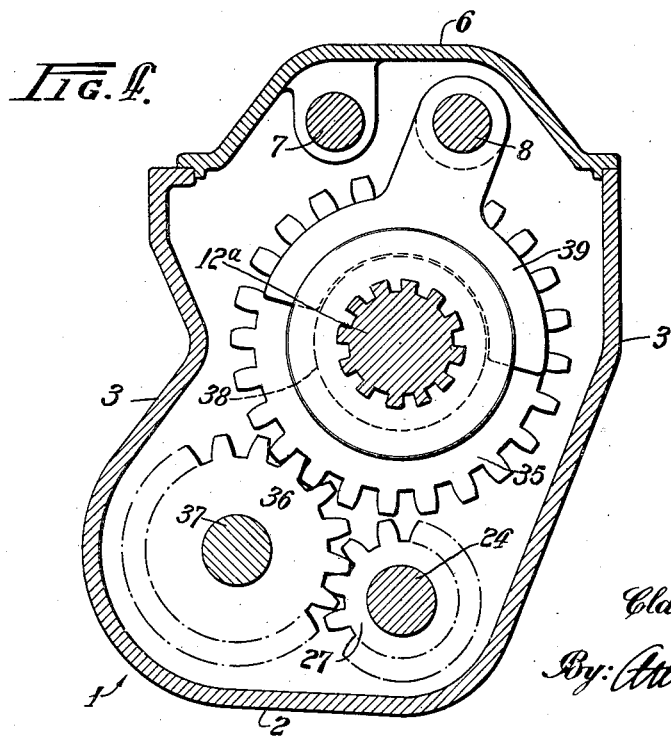
Inventor:
Clarence H. Barton,
By: Arthur W. Nelson
Att'y.

Patented Jan. 9, 1934

1,942,633

UNITED STATES PATENT OFFICE 1,942,633

TRANSMISSION

Clarence H. Barton, Indianapolis, Ind., assignor to L. G. S. Devices Corporation, Indianapolis, Ind., a corporation of Indiana Application December 22, 1930
Serial No. 503,926

11 Claims. (Cl. 74—59)

This invention relates to improvements in transmission and it consists of the matters hereinafter described and more particularly pointed out in the appended claims.

My invention is especially adapted for use in transmissions of automotive vehicles and it will be so described, but as will be apparent, certain of the features thereof may also be used for other purposes where the peculiar characteristics of the invention make it of advantage to do so.

The primary object of the invention is to provide a transmission especially adapted for automotive vehicle use and which is simple in construction with the parts so correlated and arranged that the jack shaft and its associated gears are passive or idle when the vehicle is being driven in high gear.

A further object of the invention is to provide a transmission of this kind wherein both a direct and indirect drive is provided between the driving and driven shafts of the transmission by means of a sleeve surrounding coacting parts on said shafts and shiftable in the proper directions to provide the desired drive between said shafts, certain power transmitting elements employed in the indirect drive being rendered passive when the sleeve has been shifted to provide the direct drive between said shafts.

The above mentioned objects of the invention as well as others, together with the many advantages thereof, will more fully appear as I proceed with my specification.

In the drawings:—

Fig. 1 is a longitudinal vertical sectional view through a transmission embodying my invention.

Figs. 2 and 3 are fragmentary views on an enlarged scale of a portion of the structure shown in Fig. 1 with parts thereof in changed relation and which will be more fully referred to later.

Fig. 4 is a transverse vertical sectional view through the transmission as taken on the line 4—4 of Fig. 1.

Figs. 5 and 6 are longitudinal detail vertical sectional views through certain shiftable collars or sleeves embodied in my invention to be more fully referred to later and show the position of the internal gear teeth thereof.

Referring now in detail to that embodiment of the invention, illustrated in the accompanying drawings:—1 indicates the open top casing of the transmission which includes a bottom wall 2, side walls 3, and end walls 4 and 5 respectively. Associated with said casing and closing the open top thereof is a cover 6 secured to the casing in any suitable manner. In said cover are the shift rods or rails 7 and 8 respectively, both formed at their front ends to be operatively engaged by the bottom end of a shift lever 9 having a ball and socket engagement in a hollow cone like housing 10 rising from one end of the cover plate.

The shift rod 7 is for the second and high gear of the transmission while the rod 8 is for the low and reverse gear of the transmission.

11 indicates the drive shaft of the transmission adapted to be connected with the engine (not shown) in any suitable manner and 12 indicates the coaxially disposed driven shaft of the transmission adapted to be connected up with the propeller shaft of an automobile in any suitable manner.

The drive shaft 11 which is journalled in anti-friction bearings 13 in the front wall 4 of the casing has a bell shaped enlargement 14 at its rear end provided on its periphery with clutch teeth 15.

In the rear end of said shaft is an axial recess 16 to receive roller bearings 17 for the reduced front end portion 18 of the driven shaft 12. This shaft which is journalled near its rear end in anti-friction bearings 19 in the rear wall 5 of the casing, is longitudinally splined as at 12ª for a suitable distance forward of said bearing for a purpose soon to appear.

The shaft 11 has journalled thereon, between the bearing 13 and enlargement 14, a sleeve 20 provided at its front end with spur teeth 21 and at its rear end with clutch teeth 21ª. The teeth 21 constantly mesh with the teeth of a gear 22 on the front end of a sleeve 23 journalled on a jack shaft 24 that is fixed at its ends in the front and rear walls 4 and 5 respectively of the casing. Also, on the jack shaft sleeve are gears 25, 26 and 27 respectively.

On the front end of splined portion 12ª of the shaft 12 and rotative therewith is a substantially elongated gear like cylindrical block member 28 having dedendum clutch teeth 29 on its periphery at one end and formed with a hub 30 of reduced diameter at its rear end. Rotative on said hub is a gear 32 having a set of front end clutch teeth 31. This gear is secured against longitudinal movement on the splined part 12ª of the shaft by means of front and rear collars 33 and 34 respectively, the latter collar also acting to hold the previously mentioned duplex gear upon the hub 30. In the periphery of the member 28 near its front end and disposed between two of adjacent clutch teeth 29 thereof is a tapering notch or recess 28ᵃ the purpose of which will later appear.

Longitudinally shiftable on the splined part 12ᵃ of the shaft 12 between said duplex gear and the bearing 19 is a gear 35 adapted to be shifted into engagement either with the gear 26 on the jack shaft or with an idle reverse gear 36 on a shaft 37 in the casing (see Fig. 4) this reverse gear being normally in mesh with the gear 27 on the jack shaft. The gear 35 is provided on its gear surface with an annular groove 38 in which is engaged a shifter yoke 39 secured to the shift rod 8 so as to be actuated thereby.

40 indicates a longitudinally movable sleeve or collar normally surrrounding the gear like member 28. This sleeve or collar has interior full depth clutch teeth 41 extending the full length thereof. The front end of this sleeve or collar is tapered or coned exteriorly as at 42 and is formed midway between its ends with an annular rib or shoulder 43. In this rib or shoulder and opening through one of the teeth 41 of the sleeve is a spring pressed detent or pin 43ᵃ to coact with the previously mentioned recess or notch 28ᵃ as will soon appear.

44 indicates a second longitudinally movable sleeve normally surrounding the rear end portion of the member 20 and the tapered front end portion of the sleeve 40. This sleeve 44 is provided at its front end with internal dedendum clutch teeth 45 and on the exterior of the front end of this sleeve is provided an annular groove 46 in which is engaged a yoke 47 fixed to the shift rod 7. The rear end of said sleeve 44 projects beyond the annular shoulder 43 of the sleeve 40 and has an internal annular groove 48 into which is sprung a locking ring 49 whereby, although a relative rotative movement may occur between said sleeves, they are both longitudinally movable without separation. In this respect it is pointed out that the sleeve 44 is provided at a point between the teeth 45 and locking ring groove 48 with an internal cone or tapered surface 50 to coact with the external taper or cone surface 42 on the front end of the sleeve 40.

In Fig. 1, the parts are shown in neutral position and it is to be assumed that the driving shaft 11 is in operation. Under such conditions and with the teeth 15 thereof in mesh with the dedendum clutch teeth 45 of the sleeve 44, this sleeve through its teeth and the clutch teeth 21ᵃ of the gear 20 will drive said gear. Said gear because of the meshing of its teeth 21 with those of the gear 22 will drive the sleeve 23 on the jack shaft 24 and the gear 25 on said sleeve will drive the previously mentioned gear 32 through its teeth.

In the manipulation of the lever 9 to provide "high" and "second" speed gear, said lever is shifted in one direction to impart a forward movement to the rod 7 for "high" and is shifted in the other direction to impart a rearward movement to said rod for "second".

In mentioning "high" gear I mean a direct or one to one connection between said driving and driven shafts and in mentioning "second" I mean an indirect or differential in ratio connection between said shafts.

A forward movement of the shift rod 7 from the neutral position shown in Fig. 1, upon manipulation of the lever 9 in the proper manner, will through the yoke 47, shift the sleeve 44 forwardly and because of the connection between said sleeves 44 and 40, the sleeve 40 will move forwardly therewith. This movement of the sleeves is such as to bring the spring pressed pin 43ᵃ of the sleeve 40 into engagement with the recess 28ᵃ and will take the clutch teeth 45 out of engagement with the clutch teeth 15 and will move the front ends of the clutch teeth 41 of the sleeve 40 into engagement with said clutch teeth 15. This position of the sleeves 40 and 44 is best shown in Fig. 2 wherein it is apparent that the gear 20 is non-rotative as are the jack shaft gears.

Thus the drive is direct from the shaft 11 through the clutch teeth 15 and 41 to the sleeves 40 and as the clutch teeth 41 are engaged with the teeth 29 of the gear like block 28 and as the same is splined to the shaft 12 as before described, it is apparent that the shaft 12 is driven at a one to one ratio from the shaft 11.

A rearward movement of the shift rod 7 from the position shown in Fig. 2, upon manipulation of the lever 9 in the proper manner, will through the yoke 47 shift the sleeve 44 rearwardly and because of coned or tapered connection of this sleeve with the sleeve 40, a like movement is imparted to said sleeve. However, rearward movement of the sleeve 40 under such conditions is resisted by the holding action of the spring pressed detent or pin 43ᵃ in the recess 28ᵃ of the member 28. This resistance causes an engagement between said cone shaped clutch surfaces 42 and 50 whereby the driving action of the sleeve (through the clutch teeth 15 and 41) will be transmitted through the clutch surfaces 42 and 50 to the sleeve 44 thus starting rotation of the teeth thereof previous to an attempt to engage the same with the clutch teeth 15 of the driving shaft, so that upon sufficient pressure the sleeve 44 will cause the spring pressed detent 43ᵃ to slip out of its notch or recess 28ᵃ to restore the parts to neutral position, as shown in Fig. 1.

In a further rearward movement of the rod 7 from neutral position, to provide "second" speed gear, the teeth 45 of the sleeve 44 will engage with the clutch teeth 21ᵃ of the gear 20 and with the teeth 15 on the part 14 of the drive shaft. The rear end portion of the clutch teeth 45 in this position will overhang the front end of the clutch teeth 29 on the member 28 but as the clutch teeth 45 and 29 are both dedendum teeth they do not engage each other. In this movement of the sleeves, the rear end portions of the clutch teeth 41 of the sleeve 40 will move into engagement with the clutch teeth 31 of the gear 32 before mentioned, as best shown in Fig. 3.

Thus the drive is through the clutch teeth 15 to the clutch teeth 45 of the sleeve 44 and from there to the clutch teeth 21ᵃ of the gear 20. As this gear 20 is being driven, it is apparent that its teeth 21 will drive the gear 22 of the sleeve 23 on the jack shaft 24 and this through the gear 25 will drive the gear 32 before mentioned through its teeth. As the clutch teeth 41 of the sleeve 40 are engaged with the clutch teeth 31 of said gear 32, as well as with the clutch teeth 29 on the cylindrical block member 28, it is apparent that said member 28 is driven and acts to drive the shaft 12 at a differential in ratio with respect to the driving shaft 11.

It is apparent from the foregoing that when the shaft 12 is being driven direct or in "high" from the shaft 11, all gear elements are in mesh, with the jack shaft and its gears remaining passive or non-rotative. These gears however, are active and rotative when the shaft 12 is being driven with a differential in ratio with respect to the shaft 11. Thus a more quiet transmission is possible when driving along in high and as the jack shaft and its gears thus remain passive or non-rotative, less heat is generated in the transmission to reduce the viscosity of the lubricant thereof, so that the life of the same is materially increased.

As to "low" and "reverse", these speed changes are accomplished by manipulating the shift lever 9 to impart movement to the rod 8, which through the yoke 39 shifts the gear 35 into mesh with the gear 26 on the jack shaft sleeve or into mesh with the reverse gear 36 which in turn meshes with the gear 27 on said sleeve.

Again, by reason of the construction described which is actuated in the usual manner, a transmission is afforded, wherein while all gear elements are in mesh in high with the jack shaft remaining passive and non-rotative.

While in describing the invention, I have referred in detail to the form and arrangement of the various parts thereof, the same is to be considered merely as illustrative so that I do not wish to be limited thereto except as may be specifically set forth in the appended claims.

I claim as my invention:—

1. A transmission embodying therein a driving shaft, a driven shaft and a jack shaft having gears thereon, a toothed member fixed with respect to the driving shaft and a gear loose thereon and in constant mesh with one of the gears on the jack shaft, a member fixed with respect to the driven shaft, and a longitudinally shiftable member operable to provide either a direct driving connection between said driving shaft and the member fixed on the driven shaft through the toothed member fixed on the driving shaft or an indirect driving connection between said driving shaft and said member fixed on the driven shaft through the gear loose on the driving shaft, said last mentioned gear being inoperative to drive the jack shaft when the member on the driven shaft is in direct connection with the drive shaft through said toothed member fixed thereon.

2. A transmission embodying therein a driving shaft, a driven shaft and a jack shaft having gears thereon, a toothed member fixed with respect to the driving shaft and a gear loose thereon and in constant mesh with one of the gears on the jack shaft, a toothed member fixed with respect to the driven shaft, and a pair of coacting relatively rotatable sleeves secured against endwise separation and each having internal teeth for engagement with the toothed member fixed on said driving shaft, the gear loose on the driving shaft and said toothed member on the driven shaft respectively, said sleeves when in one position acting through one of them to connect the gear and toothed member on the driving shaft together, said sleeves when shifted endwise in one direction from said position, acting to move the first mentioned sleeve out of engagement with the toothed member fixed on said driving shaft and engaging the second mentioned sleeve therewith, without disengagement from said toothed member on the driven shaft.

3. A transmission embodying therein a driving shaft, a driven shaft and a jack shaft having gears thereon, a toothed member fixed with respect to the driving shaft and a gear loose thereon in constant mesh with one of the gears on the jack shaft, a toothed member fixed on the driven shaft, a gear loose on said member and in constant mesh with another gear on the jack shaft, a pair of coacting, relatively rotatable sleeves secured against endwise separation and each having internal teeth for engagement with the gear toothed member fixed on the driving shaft, the gear loose on the driving shaft and said toothed member on the driven shaft respectively, said sleeves when in one position acting through one of them to connect the gear toothed member and the gear on the driving shaft together, said sleeves when shifted in one direction acting to move the first mentioned sleeve out of engagement with the gear loose on the driving shaft and to move the second mentioned sleeve into engagement with the gear loose on said toothed member on the driven shaft without disengagement from said last mentioned toothed member.

4. A transmission embodying therein a driving shaft, a driven shaft and a jack shaft having gears thereon, a toothed member fixed with respect to the driving shaft and a gear loose thereon in constant mesh with one of the gears on the jack shaft, a toothed member fixed on the driven shaft, a gear loose on said last mentioned toothed member and in constant mesh with another gear on the jack shaft, and a pair of coacting, relatively rotatable sleeves secured against endwise separation and each having internal teeth for engagement with the gear toothed member fixed on the driving shaft, the gear loose on the driving shaft and the toothed member on the driven shaft respectively said sleeves when in one position acting through one of them to connect the toothed member and the gear on the driving shaft and engaging the second sleeve therewith without disengagement from said toothed member on the driven shaft, said sleeves when shifted in the other direction acting to move the first mentioned sleeve out of engagement with the gear loose on the driving shaft and to move said second mentioned sleeve into engagement with the gear loose on said gear-like member without disengagement from said toothed member on the driven shaft.

5. In a transmission, a driving shaft and a driven shaft, a toothed member fixed on the driving shaft and a gear loose thereon and both having addendum teeth, a toothed member rotative with the driven shaft and having dedendum teeth thereon, front and rear sleeves arranged for relative rotation without endwise separation and normally surrounding said toothed member fixed on the driving shaft, the gear loose on the driving shaft and said toothed member on the driven shaft respectively, said front sleeve having dedendum teeth for engagement with the addendum teeth of said toothed member and gear on the driving shaft and said rear sleeve having addendum teeth adapted for engagement with the dedendum teeth on the toothed member on the driven shaft and the teeth of the toothed member fixed on said driving shaft.

6. A transmission embodying therein a driving shaft, a driven shaft and a jack shaft, a member loose on the driving shaft and having a connection with the jack shaft, and internally splined means normally surrounding said member and parts on said driving and driven shafts and shiftable to provide either a direct or an indirect driving connection between said driving and driven shafts, said means when shifted to provide said direct driving connection engaging said member loose on said shaft but being ineffective to drive the same, said means when shifted in the other direction driving said member so that the driven shaft is driven indirectly through the jack shaft.

7. A transmission embodying therein, a driving shaft, a driven shaft and a jack shaft, a member associated with the driving shaft and having a connection with the jack shaft operable to drive the same, a clutch member rotative with the driven shaft, a shiftable internally splined clutch sleeve including relatively rotatable parts, normally surrounding a part of the driving shaft, the member associated therewith and the clutch member rotative with the driven shaft respectively, one of said sleeve parts when said sleeve is shifted in one direction providing a direct drive between the driving shaft and driven shaft through the clutch member associated therewith, the other part of said sleeve when said sleeve has been shifted in said direction, engaging the member associated with the driving shaft but being ineffective to drive the same.

8. A transmission embodying therein a driving shaft, a driven shaft and a jack shaft, a gear associated with the driving shaft and having a constant mesh with a gear on the jack shaft, a clutch member rotative with the driven shaft, a shiftable internally splined clutch sleeve including relatively rotatable parts, normally surrounding a part of the driving shaft, a part of the gear thereon and the clutch member rotative with the driven shaft respectively, one of said sleeve parts when said sleeve is shifted in one direction providing a direct drive between the driving shaft and driven shaft through the clutch member associated therewith, the other part of said sleeve when said sleeve has been shifted in said direction, engaging the gear associated with the driving shaft and having a constant mesh with the gear on the jack shaft, but being ineffective to drive the same.

9. A transmission embodying therein a driving shaft, a driven shaft and a jack shaft, a member associated with the driving shaft and having a connection with the jack shaft operable to drive the same, a clutch member rotative with the driven shaft, a member rotative with respect to the driven shaft and having a driving connection with the jack shaft, a shiftable internally splined clutch sleeve including relatively rotatable parts, normally surrounding a part of the driving shaft, the member associated therewith and said clutch member respectively, one of said sleeve parts when said sleeve is shifted in one direction providing a direct drive between the driving shaft and the driven shaft through the clutch member associated with the latter, the other part of said sleeve when said sleeve has been shifted in said direction, engaging the member associated with the driving shaft but being ineffective to drive the same, said other part of said sleeve when said sleeve is shifted in the other direction drivingly connecting said driving shaft and the member associated therewith together, the first mentioned part of said sleeve then operating to connect the member rotative on the driven shaft to said shaft through the clutch member.

10. A transmission embodying therein a driving shaft, a driven shaft and a jack shaft, a clutch member rotative with the driving shaft, a clutch member rotative with the driven shaft, a clutch member rotative on the driving shaft and having a driving connection with the jack shaft, a clutch member rotative with respect to the driven shaft all of said clutch members having external spline teeth, a shiftable clutch sleeve comprising relatively rotatable parts normally surrounding portions of the first three mentioned clutch members and having internal spline teeth to cooperate with the external spline teeth on the before mentioned clutch members, one part of said sleeve when the same is shifted in one direction operating to positively connect the clutch members rotative with the driving and driven shafts respectively together when the other part of said sleeve is still in engagement with but ineffective to drive the clutch member rotative on the driving shaft, said first mentioned part of said sleeve when the same is shifted in the other direction operating to positively connect the clutch members rotative with and on the driving shaft respectively together so as to drive the jack shaft, said other part of said sleeve when the same is shifted in said other direction operating to positively connect the clutch members rotative with and on the driven shaft respectively together, so that said clutch member rotative with the driven shaft is driven from the jack shaft through the clutch member rotative with respect to said driven shaft.

11. A transmission embodying therein a driving shaft, a driven shaft and a jack shaft, a clutch member rotative with the driving shaft, a clutch member rotative with the driven shaft, a combined gear and clutch member rotative on the driving shaft and meshing with a gear on the jack shaft, a second combined gear clutch member loose on the clutch member on the driven shaft and meshing with a gear on the jack shaft, a shiftable clutch sleeve comprising relatively rotatable parts normally surrounding portions of said two first mentioned clutch members and said first mentioned combined gear and clutch member, one part of said sleeve when the same is shifted in one direction operating to positively connect the members rotative with the driving and driven shafts respectively together when the other part of said sleeve is in engagement with said first mentioned combined gear clutch member but ineffective to drive the same, said other part of said sleeve when said sleeve is shifted in the other direction, operating to positively connect the second combined gear and clutch member to the member rotative with the driven shaft, said first mentioned part of the clutch sleeve then operating to positively connect the member rotative with the driving shaft to the combined gear and clutch member rotative thereon.

CLARENCE H. BARTON.